US012427923B2

(12) United States Patent
Doehlert et al.

(10) Patent No.: US 12,427,923 B2
(45) Date of Patent: Sep. 30, 2025

(54) EXTERIOR MIRROR FOR A VEHICLE, RETAINING SYSTEM FOR USE WITH A FUNCTIONAL COMPONENT OF A VEHICLE

(71) Applicant: Volkswagen Aktiengesellschaft, Wolfsburg (DE)

(72) Inventors: Steffen Doehlert, Magdeburg (DE); Toralf Gresens, Flechtorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 568 days.

(21) Appl. No.: 17/858,690

(22) Filed: Jul. 6, 2022

(65) Prior Publication Data

US 2022/0340082 A1    Oct. 27, 2022

Related U.S. Application Data

(63) Continuation of application No. PCT/EP2021/050076, filed on Jan. 5, 2021.

(30) Foreign Application Priority Data

Jan. 6, 2020    (DE) ..................... 10 2020 100 103.7

(51) Int. Cl.
*B60R 1/12*    (2006.01)
*B60Q 1/34*    (2006.01)
(Continued)

(52) U.S. Cl.
CPC .............. *B60R 1/1207* (2013.01); *B60Q 1/34* (2013.01); *B60R 1/06* (2013.01); *G02B 7/182* (2013.01); *B60Q 1/247* (2022.05); *B60Q 2400/50* (2013.01)

(58) Field of Classification Search
CPC ........... B60R 1/1207; B60R 1/06; B60Q 1/34; B60Q 1/247; B60Q 2400/50;
(Continued)

(56) References Cited

U.S. PATENT DOCUMENTS 6,049,271 A    4/2000  Chu
6,511,189 B1    1/2003  Henion et al.
(Continued)

FOREIGN PATENT DOCUMENTS

DE         8510808 U1      9/1985
DE    102004025369 A1    12/2005
(Continued)

OTHER PUBLICATIONS

International Search Report dated Feb. 16, 2021 in corresponding application PCT/EP2021/050076.

*Primary Examiner* — Bumsuk Won
*Assistant Examiner* — Rahman Abdur
(74) *Attorney, Agent, or Firm* — Muncy, Geissler, Olds & Lowe, P.C.

(57) ABSTRACT

An exterior mirror for a vehicle, a retaining system for use with a functional component of a vehicle and a vehicle comprising at least one such exterior mirror. It is provided that an exterior mirror for a vehicle comprises a retaining system having a mirror module arranged thereon and at least one functional module having at least one illuminant. In an interior region of the exterior mirror, at least two retaining elements, each having groove regions, are arranged on the retaining system such that the at least one functional module is reversibly arrangeable, via sliding elements arranged on the functional module between the respective groove regions in at least one user-defined position in the interior region of the exterior mirror. In addition, a retaining system and a vehicle comprising at least one such exterior mirror are provided.

14 Claims, 4 Drawing Sheets

(51) Int. Cl.
*B60R 1/06* (2006.01)
*G02B 7/182* (2021.01)
*B60Q 1/24* (2006.01)

(58) Field of Classification Search
CPC ..... B60Q 1/0064; B60Q 2900/10; B60Q 1/2665;
G02B 7/182
USPC ........................................................ 359/512
See application file for complete search history.

(56) References Cited

U.S. PATENT DOCUMENTS

| | | |
|---|---|---|
| 7,492,281 B2 | 2/2009 | Lynam et al. |
| 7,674,025 B2 | 3/2010 | Liesener |
| 7,677,775 B2 | 3/2010 | Oehmann |
| 9,796,333 B2 | 10/2017 | Schmierer |
| 10,759,348 B2 | 9/2020 | Messenger et al. |
| 2011/0013409 A1 | 1/2011 | Hwang et al. |
| 2019/0344717 A1 | 11/2019 | Sinelli et al. |

FOREIGN PATENT DOCUMENTS

| | | |
|---|---|---|
| DE | 102005047189 A1 | 4/2007 |
| DE | 102012108480 B3 | 2/2014 |
| EP | 1914118 A2 | 4/2008 |
| WO | WO2018178268 A2 | 10/2018 |

EXTERIOR MIRROR FOR A VEHICLE, RETAINING SYSTEM FOR USE WITH A FUNCTIONAL COMPONENT OF A VEHICLE

This nonprovisional application is a continuation of International Application No. PCT/EP2021/050076, which was filed on Jan. 5, 2021, and which claims priority to German Patent Application No. 10 2020 100 103.7, which was filed in Germany on Jan. 6, 2020, and which are both herein incorporated by reference.

BACKGROUND OF THE INVENTION

Field of the Invention

The invention relates to an exterior mirror for a vehicle, a retaining system for use with a functional component of a vehicle and a vehicle comprising at least one such exterior mirror.

Description of the Background Art

In the automotive industry, two trends continue unabated. On the one hand, the products themselves are becoming increasingly complex. In particular, new functions and systems are increasingly being integrated into existing vehicles in order to increase both safety and user-friendliness during the time of use. On the other hand, the range of options for the vehicles being delivered is increasing. A variety of client demands to individually customize their specific vehicle are driving this trend. In order to counter these developments, components and technical solution concepts which enable a flexible and compact design are increasingly in demand. With regard to attachment parts, in particular in connection with mirror systems, various concepts are already available on the market. From the prior art, some examples from the field of exterior mirrors for vehicles are presented in more detail below.

For example, publication DE 10 2004 025 369 A1, which corresponds to US 2007/0242469, discloses an exterior rear view mirror for vehicles, in particular for motor vehicles. The exterior rear view mirror has a mirror housing with a mirror glass, which is arranged on a mirror glass carrier. In order to design the exterior rear view mirror in such a way that a simple and cost-effective installation of an illuminant is possible requiring little space, at least one component is held on the mirror glass carrier that includes at least one illuminant. The illuminant can be housed in the attachment part in a simple and space-saving manner. The exterior rear view mirror is particularly suitable for motor vehicles.

An exterior rear view mirror having illuminants is also known from EP 1 914 118 A2, which corresponds to US 2008/0112176. The exterior rear view mirror has a mirror head, which is provided with a mirror glass and at least one illuminant that radiates light through at least one translucent area to the outside. Furthermore, the exterior rear view mirror has a mirror base. In order to design the exterior rear view mirror in such a way that the light function can be optimally fulfilled with a simple mirror design, at least a part of the housing of the mirror head and/or the mirror base can be formed of at least two plastic layers, which have varying degrees of light transmission. In the translucent area, the plastic layer with the lower light transmission is missing or is only so thick that the light emitted by the illuminant radiates outwards with sufficient light intensity. The plastic layer of higher light transmission can be used as a light disc for the illuminant behind it. The plastic layer of lower light transmission may be provided to lend the transparent area its own color.

In addition, a rear view assembly for a motor vehicle with an interchangeable approach lamp can be found in publication WO 2018/178268 A2, US 2020/0114825. In particular, a system for providing interchangeable approach lamps for use with an external rear view assembly is disclosed, wherein the system comprises the following: a first approach lamp module, comprising a first housing comprising a front face and a rear face, a first side face, a second side face, a proximal face and a distal face, wherein the proximal face comprises an aperture for receiving a power cable; a first set of mounting surfaces located on the first housing, the first set comprising one or more mounting surfaces; a first printed circuit board mounted adjacent the rear face, wherein the first printed circuit board further comprises a power connector, a first electronic circuit and a first illuminant.

In addition, a first optical assembly is mounted on the first printed circuit board to receive light from the first illuminant and comprises a first light exiting surface projecting out of the front face of the first housing. Furthermore, the system comprises a second approach lamp module, comprising a second housing comprising a front face, a rear face, a first side face, a second side face and a proximal face and a distal face, wherein the proximal face comprises an aperture for receiving a power cable; a second set of mounting surfaces located on the second housing, wherein the second set comprises one or more mounting surfaces, a second printed circuit board mounted adjacent the rear face, wherein the second printed circuit board further comprises a power connector, a second electronic circuit and a second illuminant. A second optical assembly is mounted to the second circuit board, which assembly is mounted in such a way that it receives light from the second illuminant and comprises a projection assembly for projecting a logo or mask and a second exiting light. The locations of each of the first set of mounting surfaces and the locations of each of the second set of mounting surfaces are identical, and a location and a size of the first light exiting surface is identical to a location and a size of the second light exiting surface, and a location of the first illuminant is identical to a location of the second illuminant, such that a distance from the rear face of the first housing to the first light exiting surface is the same as the distance from the rear face of the second housing to the second light exiting surface, wherein each location is relative to the locations of each of the first set of mounting surfaces, so that in use, each of the first approach lamp module and the second approach lamp module are mounted in the same location in the side mirror assembly and project light through an external side of an aperture in the side mirror assembly to allow for interchanging of the approach lamp modules.

The invention also relates to an approach lamp module for use in such a system, an exterior rear view side mirror assembly for a motor vehicle comprising such a system and a method for replacing an installed approach lamp for use in such a system.

SUMMARY OF THE INVENTION

It is therefore an object of the present invention to provide an alternative exterior rear view mirror for a vehicle and a retaining system, which allow for cost-effective maintenance and user-friendly adjustment processes.

In an example, it is provided that an exterior mirror is provided for a vehicle. Such an exterior mirror comprises a retaining system having a mirror module arranged thereon and at least one functional module having at least one illuminant. In an interior region of the exterior mirror, at least two retaining elements, each having groove regions, are arranged on the retaining system such that the at least one functional module is reversibly arrangeable, by means of sliding elements arranged on the functional module, between the respective groove regions in at least one user-defined position in the interior region of the exterior mirror. In this way, it is possible to provide an alternative exterior mirror for a vehicle, which ensures cost-effective maintenance and user-friendly adjustment processes. The respective functional module can thus be easily inserted, by means of the sliding elements, on the respective groove regions in a user-defined manner. It can also be removed in the same way or replaced by another. In other words, a respective functional module can be moved easily and without much effort, for example for upcoming maintenance, and then moved back to a desired location. The principle is similar to that of a drawer system. This drawer principle thus also allows for an easy interchange of respective functional modules. The retaining system can accommodate only one or more functional modules. In other words, it is possible to slide more than just one functional module on the respective groove regions. For example, two superimposed functional modules can be provided, wherein both functional modules are easy to service and can also be interchanged easily and conveniently in accordance with customer requirements. Thus, placement or attachment of such functional modules in or to the interior region of the exterior mirror is carried out by means of a slot inside the mirror.

A retaining system can be provided for use with a functional component of a vehicle. Such a retaining system comprises at least two retaining elements, each having groove regions, wherein the retaining system also comprises at least two sliding elements, which are designed to be arranged on a functional component, wherein the at least two retaining elements are designed to be arranged at least partially on the outside and/or inside of a vehicle, so that the functional component on the vehicle can be reversibly arranged in a user-defined manner. In this way, for example, a functional module can be arranged in an interior region of an exterior mirror in such a way that both cost-effective maintenance and user-friendly adaptation processes can be guaranteed.

The presented retaining system can also be transferred to other assemblies of the vehicle. For this purpose, the sliding elements are arranged accordingly on any functional component, so that they can then be reversibly arranged in a user-defined manner on the vehicle, depending on the location of the compatible retaining elements with the appropriate groove regions. Dimensions of the sliding elements and the groove regions can be coordinated in such a way that a certain position can be customized due to resulting friction between the two components. In other words, these sliding elements can be brought into a target end position by means of a certain insertion force to be applied, without the functional component falling out again, for example due to force of gravity. The groove regions can be open at the respective end areas, so that a circumferential insertion of the sliding elements is guaranteed. Thus, the functional component can either be released from the retaining system via the same path or pushed through in such a way that the functional component can be released accordingly, via the second end area of the groove regions, from the previously user-defined position on the vehicle.

In this context, it is also conceivable that the retaining elements, each having a groove region, can accommodate more than one functional component. It is also conceivable that the respective groove regions of the retaining elements have an exclusively straight course and/or a curved course. It is conceivable that an end position of the fitted functional component lies both in a different plane than at least one end area of the respective groove regions, and in a different area of the vehicle. The presented retaining system may also include at least one fixing system which is designed to fix or arrange the fitted functional components on at least one user-defined position relative to the retaining elements and/or relative to further functional components or to an alignment of at least a part of the vehicle. Such a fixing system may include, for example, locking knobs comprising compatible aperture areas, which are arranged accordingly on the retaining elements and sliding elements. Both a reciprocal distribution and a one-sided arrangement are conceivable. In other words, for example, the locking knobs may be provided exclusively on the sliding elements, and the compatible aperture areas on the retaining elements and vice versa. The retaining system may be made of a material, for example plastic. A mix of materials is also conceivable. For example, the presented retaining system may at least partially comprise metal and/or metal alloys.

It is also provided that a vehicle can include at least one exterior mirror according to the above. The aforementioned advantages can be regarded as transferable to the presented vehicle.

The retaining system comprises at least one cap element and at least one aperture element, wherein the at least two retaining elements, each having groove regions, are arranged both on the at least one cap element and on the at least one aperture element. This allows for a fitted functional module to be positioned in a user-defined position to the cap element or in a user-defined position to the aperture element. It is also conceivable that the fitted functional module can be arranged both in a user-defined position to the cap element and in a user-defined position to the aperture element. Also, two functional modules can be fitted in such a way that one functional module is positioned relative to the cap element and the other functional module is positioned accordingly relative to the aperture element. This flexibility thus facilitates upcoming changes in positioning, which are necessary, for example, due to upcoming maintenance or when generally replacing the functional modules. The functional modules can also be moved in the interior region in such a way that other modules behind them, such as an actuator of the mirror module, are easier and more convenient to reach.

It is also provided in a further embodiment of the invention that the functional module is selected from: courtesy light element, projection light module, lane change indicator element. The aforementioned advantages are also transferable to these respective variants. In particular, it may be provided to arrange two or more of these functional modules in respective suitable positionings, relative to the cap element or the aperture element. The provided retaining system, in particular, favors such an alignment of several functional modules in the exterior mirror.

Furthermore, in a further embodiment of the invention, it is provided that the at least one cap element has a translucent area between the at least two retaining elements and/or wherein the at least one aperture element has a translucent area between the at least two retaining elements. Thus, a respective illuminant of the respective functional module can be perceived particularly well outside of the exterior mirror. The positioning of the respective illuminant is favored due to the position between the two retaining elements. In addition, the respective illuminant may be decoupled from a design outer skin or a respective external component of the cap element and/or the aperture element. A respective orientation of the functional modules or the corresponding illuminants is thus also possible independently of the translucent area, so that particularly reliable functioning can be guaranteed or made available.

In addition, it is provided that the respective translucent areas at least partially comprise a transparent material, in particular plastic, in particular polymethyl methacrylate. The aforementioned advantages are therefore particularly easy and cost-effective to achieve. For example, this plastic can be introduced in the cap element and/or in the aperture element by means of 2K technology. In this respect, for example, light transmission takes place in the cap element and/or the aperture element through the transparent plastic.

It is also provided that the at least one functional module in a reversibly arranged state between the respective groove regions can be reversibly positioned on the retaining elements by means of a fixing system. Thus, in addition to the retaining forces due to resulting friction between the sliding elements and the groove regions, a user-defined desired positioning can be guaranteed sustainably. In particular, if the vehicle drives over uneven route segments during a use phase, an onset of vibration forces can negatively affect the desired positioning. The fixation system then counteracts this and causes stable and consistent positioning of the functional module or the functional modules relative to the other components of the exterior mirror.

Furthermore, it is provided that the fixing system can include locking knobs at the at least one functional module and compatible aperture areas on the retaining system, or wherein the fixing system includes locking knobs on the at least one retaining system and compatible aperture areas on the at least one functional module. The aforementioned advantages can thus be achieved even better. In addition, such a fixing system is particularly suitable for providing reversibility. Occurring retaining forces or retaining positions of the locking knobs can either be released or cancelled by means of a sufficient force to be applied or can be changed mechanically. For example, the locking knobs can be easily pushed out of the respective, compatible aperture areas.

It is provided that the respective groove regions can each have two open end areas, so that a circumferential insertion of the sliding elements is guaranteed. Thus, cost-effective maintenance and user-friendly adjustment processes can be ensured even better.

The presented exterior mirror can be used in all vehicles, especially in motor vehicles that have or require mirror components.

The various embodiments of the invention mentioned in this application can be, unless otherwise stated in individual cases, advantageously combined with each other.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
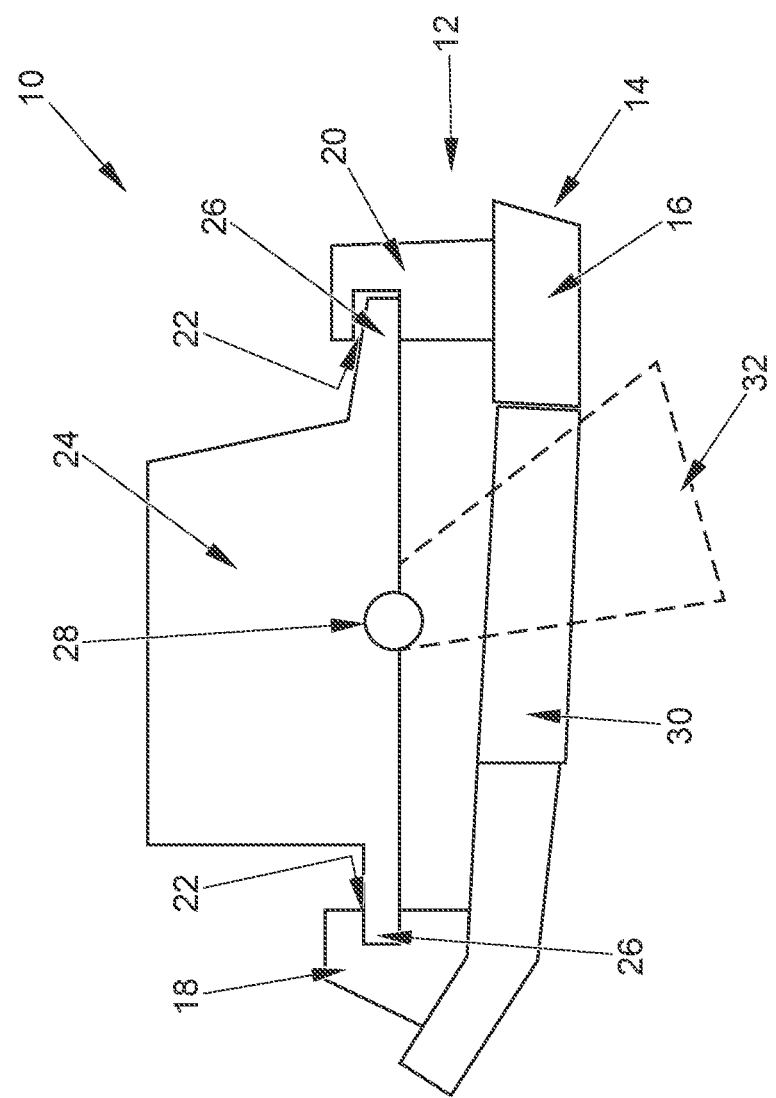
FIG. 1 is a schematic sectional view of an exterior mirror.

FIG. 1 shows a schematic sectional view of an exterior mirror 10. In particular, inner workings of the exterior mirror 10 are shown in a top view. On a retaining system 12, a mirror module 14 is arranged, wherein in this FIG. 1 of the mirror module 14 only a section of an aperture element 16 of the mirror module 14 is shown, on which two retaining elements 18, 20 of the retaining system 12 are arranged. The two retaining elements 18, 20 each have opposite groove ranges 22. Between the respective groove regions 22, a functional module 24 is shown by means of sliding elements 26 arranged on this functional module 24. The sliding elements 26 are pushed onto the groove regions 22 similar to a drawer principle, so that the functional module 24 is held in a user-defined position relative to the mirror module 14 due to the coordinated dimensions of the groove regions 22 relative to the dimensions of the sliding elements 26. In other words, the functional module 24 can be reversibly arranged by means of sliding elements 26 arranged on the functional module 24, between the respective groove regions 22 in at least one user-defined position in the interior region of the exterior mirror 10. This relative position requires that a displayed illuminant 28 can radiate light from the functional module 24 through a translucent area 30 of the aperture element 16 into an area outside of the exterior mirror 10.

It is therefore conceivable that this position can also be changed by a simple shifting process, so that another desired position can be achieved. Also, more than one functional module 24 may be provided. For example, two or more functional modules 24, which are also either identical in construction or differ in at least one feature, could be fitted. For example, two functional modules 24 could be fitted directly on top of each other. The groove regions 22 are designed in such a way that the sliding elements 26 can be pushed into each of the two open areas of the groove regions 22 and can accordingly also again exit these groove regions 22. A dashed area 32 also indicates a possible light field into which the illuminant 28 emits light in an activated state. The translucent area 30 is, in particular, a solid component of the aperture element 16, which comprises, for example, a transparent material, in particular plastic, in particular polymethyl methacrylate. It is conceivable that more than one illuminant 28 is provided on the functional module 24. For example, in an unspecified variant, two illuminants 28 arranged parallel to each other could be provided. These illuminants 28 may include, for example, LED elements or the like. For example, the functional module 24 may be selected from the following components: courtesy light element, projection light module, lane change indicator element.

Figure 2:
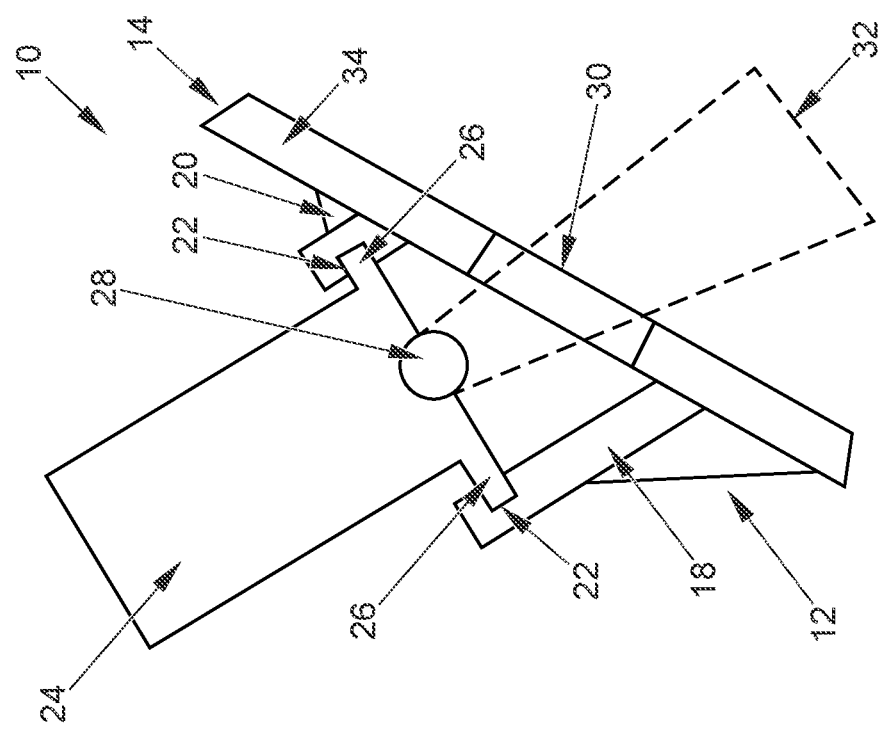
FIG. 2 is a further schematic sectional view of an exterior mirror.

FIG. 2 shows another schematic sectional view of an exterior mirror 10. In particular, inner workings of the exterior mirror 10 are shown in a top view. On a retaining system 12, a mirror module 14 is arranged, wherein in this FIG. 2 of the mirror module 14 only a section of a cap element 34 of the mirror module 14 is shown, on which two retaining elements 18, 20 of the retaining system 12 are arranged. The two retaining elements 18, 20 each have opposite groove regions 22. Between the respective groove regions 22, a functional module 24 is shown by means of sliding elements 26 arranged on this functional module 24. The sliding elements 26 are pushed onto the groove regions 22 similar to a drawer principle, so that the functional module 24 is held in a user-defined position relative to the mirror module 14 due to the coordinated dimensions of the groove regions 22, relative to the dimensions of the sliding elements 26. In other words, the functional module 24 can be reversibly arranged, by means of sliding elements 26 arranged on the functional module 24, between the respective groove regions 22 in at least one user-defined position in the interior region of the exterior mirror 10. This relative position requires that a displayed illuminant 28 can radiate light from the functional module 24 through a translucent area 30 of the aperture element 16 into an area outside of the exterior mirror 10.

It is therefore conceivable that this position can also be changed by a simple shifting process, so that another desired position can be achieved. Also, more than one functional module 24 may be provided. For example, two or more functional modules 24, which are also either identical in construction or differ in at least one feature, could be fitted. For example, two functional modules 24 could be fitted directly on top of each other. The groove regions 22 are designed in such a way that the sliding elements 26 can be fitted in each of the two open areas of the groove regions 22 and accordingly also exit these groove areas 22. A dashed area 32 also indicates a possible light field into which the illuminant 28 emits light in an activated state. The translucent region 30 is in particular a solid component of the cap element 34, which comprises, for example, a transparent material, in particular plastic, in particular polymethyl methacrylate. It is conceivable that more than one illuminant 28 is provided on the functional module 24. For example, in an unspecified variant, two illuminants 28 arranged parallel to each other could be provided. These illuminants 28 may include, for example, LED elements or the like. For example, the functional module 24 may be selected from the following components: courtesy light element, projection light module, lane change indicator element. The shown retaining elements 18, 20 may represent a further portion of the retaining elements 18, 20 already shown in FIG. 1, wherein, accordingly, the functional module 24 shown is correspondingly identical to the one shown in FIG. 1. Accordingly, the shown functional module 24 is fitted on the retaining elements 18, 20, wherein the retaining elements 18, 20 are arranged accordingly both on the aperture element 16 and on the cap element 34. It is also conceivable that these are essentially similarly designed, but stand-alone, retaining elements 18, 20, wherein then the respective retaining elements 18, 20 of the retaining system 12 are each arranged separately on the aperture element 16 and on the cap element 34, respectively, in such a way that the functional module 24 is arranged both on the aperture element 16 and on the cap element 34. It is also conceivable that the shown retaining elements 18, 20 from FIGS. 1 and 2 differ in detail and represent self-contained variants. In particular, it is therefore conceivable that the functional module 24 is arranged only on the aperture element 16 or only on the cap element 34 and is then arranged in the respective way in the interior region of the exterior mirror 10. Both the cap element 34 and the aperture element 16 can be made of any copolymer, in particular ASA, ABS.

Figure 3:
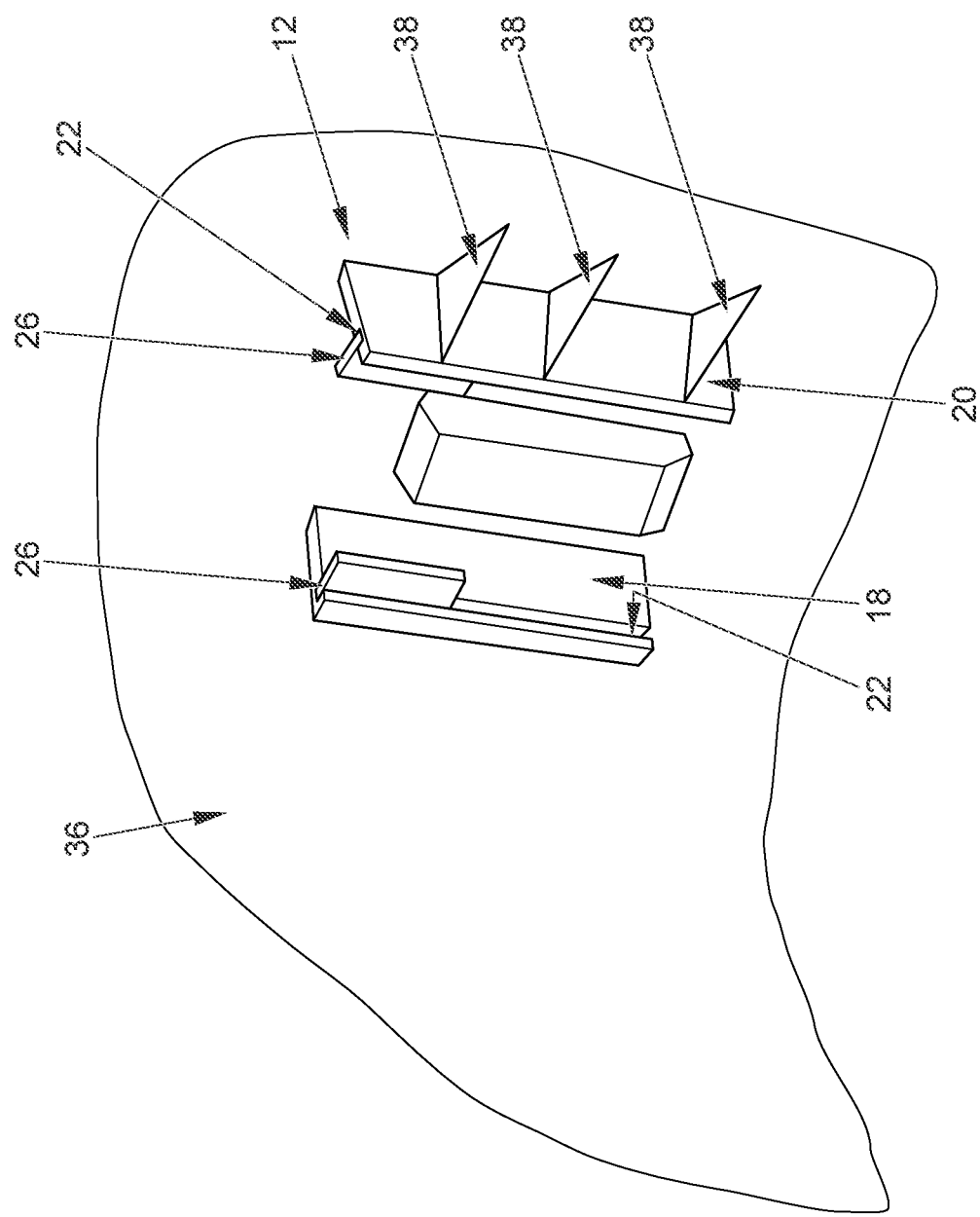
FIG. 3 is a schematic perspective view of a retaining system for use with a functional component of a vehicle.

FIG. 3 shows a schematic perspective view of a retaining system 12 for use with a functional component 36 of a vehicle. The retaining system 12 is shown comprising two retaining elements 18, 20, each having groove regions 22. In addition, the retaining system 12 is shown comprising two sliding elements 26. The two retaining elements 18, 20 are designed to be arranged at least partially on the outside and/or inside of a vehicle, so that the functional component 36 on the vehicle can be arranged reversibly and in a user-defined manner. The retaining elements 18, 20 may be substantially identical to those shown in FIGS. 1 and 2, wherein, in particular, all retaining elements 18, 20 shown have the respective corresponding groove regions 22. The functional component 36 may be, for example, an exterior mirror 10 for a vehicle. On the right retaining element 20 (with respect to the image plane) three web elements 38 are also shown. These web elements 38 are substantially identical in construction and have a substantially triangular basic shape. The web elements 38 support the retaining element 20 so that it can be attached or arranged accordingly stable to the functional component 36. The left retaining element 18 (with respect to the image plane), although not visible in detail in this illustration, can be held or arranged on the functional component 36 in the same manner by means of the provided web elements 38.

Figure 4:
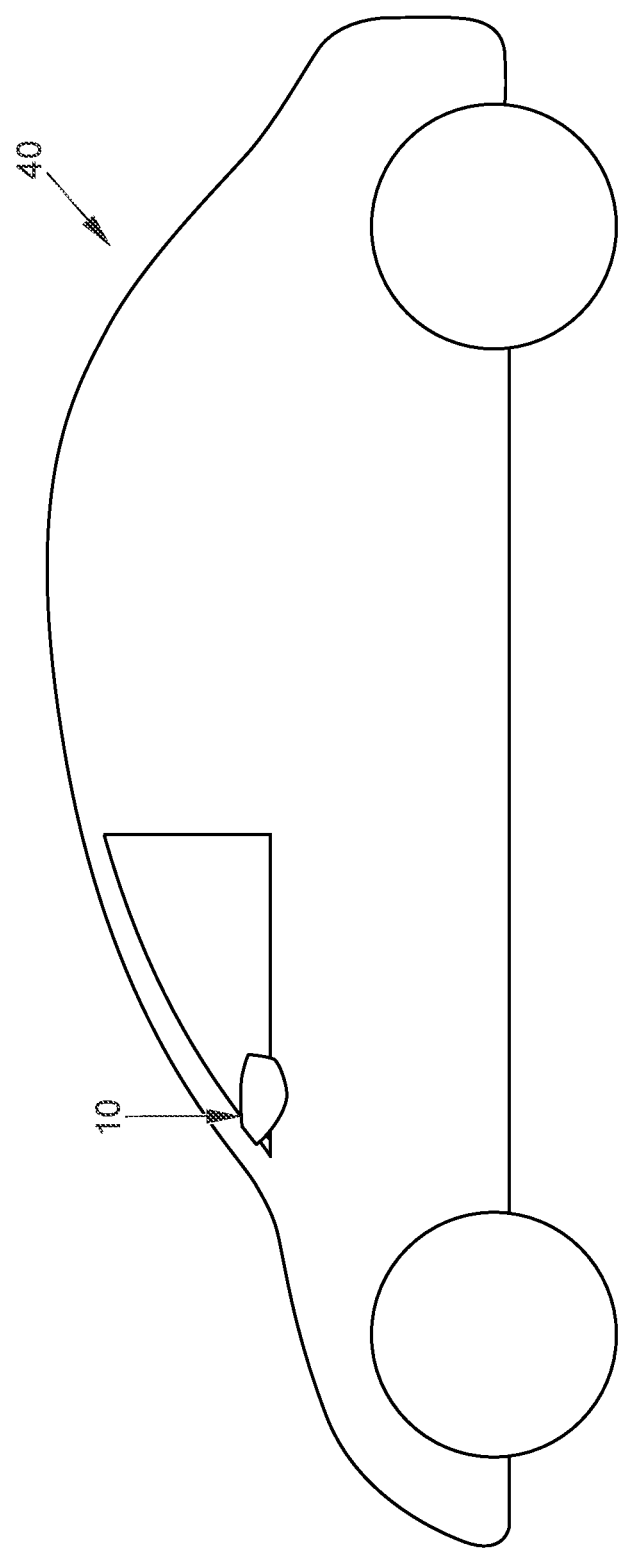
FIG. 4 is a vehicle comprising an exterior mirror according to any one of claims 1 to 8.

FIG. 4 shows a vehicle comprising an exterior mirror 10 according to any one of claims 1 to 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exterior mirror for a vehicle, the mirror comprising:
a retaining system having at least two retaining elements being arranged on the retaining system in an interior region of the exterior mirror, each of the at least two retaining elements having respective grooves;
a mirror module arranged on the retaining system; and
at least one functional module having at least one illuminant and having sliding elements arranged thereon,
wherein the sliding elements of the at least one functional module are slidable in the respective grooves of the at least two retaining elements, such that the at least one functional module is reversibly arrangeable in at least one user-defined position in the interior region of the exterior mirror, and
wherein the sliding elements are slidable in the respective grooves along a longitudinal extent of the respective grooves.

2. The exterior mirror according to claim 1, wherein the retaining system comprises at least one cap element and at least one aperture element, and wherein the at least two retaining elements are arranged on the at least one cap element and on the at least one aperture element.

3. The exterior mirror according to claim 2, wherein the at least one cap element comprises a translucent area between the at least two retaining elements and/or wherein the at least one aperture element comprises a translucent area between the at least two retaining elements.

4. The exterior mirror according to claim 3, wherein the respective translucent areas at least partially comprise a transparent material, a plastic, and/or a polymethyl methacrylate.

5. The exterior mirror according to claim 1, wherein the at least one functional module is a courtesy light element, a projection light module, or a lane change indicator element.

6. The exterior mirror according to claim 1, wherein the at least one functional module is reversibly arranged on the at least two retaining elements by a fixing system.

7. The exterior mirror according to claim 6, wherein the fixing system comprises locking knobs at the at least one functional module and compatible aperture areas on the retaining system or wherein the fixing system comprises locking knobs on the retaining system and compatible aperture areas on the at least one functional module.

8. The exterior mirror according to claim 1, wherein the respective grooves each comprise two open end areas so that a circumferential insertion of the sliding elements is facilitated.

9. The exterior mirror according to claim 8, wherein the two open end areas of the respective grooves are longitudinal ends of the respective grooves.

10. A vehicle comprising at least one exterior mirror according to claim 1.

11. The exterior mirror according to claim 1, wherein the longitudinal extent of the respective grooves is perpendicular to a depth direction and a width direction of the respective grooves, such that the longitudinal extent of the respective grooves corresponds to a length of the respective grooves.

12. A retaining system for a functional component of a vehicle, the retaining system comprising:
   at least two retaining elements, each having respective grooves; and
   at least two sliding elements which are designed to be arranged on the functional component, the at least two sliding elements being slidable in the respective grooves along a longitudinal extent of the respective grooves,
   wherein the at least two retaining elements are designed to be arranged at least partially outside and/or inside of a vehicle, such that the functional component is adapted to be reversibly arranged on the vehicle in at least one user-defined position.

13. The retaining system according to claim 12, wherein the longitudinal extent of the respective grooves is perpendicular to a depth direction and a width direction of the respective grooves, such that the longitudinal extent of the respective grooves corresponds to a length of the respective grooves.

14. The retaining system according to claim 12, wherein the respective grooves each comprise two open end areas so that a circumferential insertion of the at least two sliding elements is facilitated, and wherein the two open end areas of the respective grooves are longitudinal ends of the respective grooves.

* * * * *